United States Patent [19]

Horiguchi et al.

[11] 4,393,398

[45] Jul. 12, 1983

[54] APPARATUS FOR SIMULATING COLOR PRINTING PROCESS

[75] Inventors: Satoru Horiguchi, Saitama; Takeshi Sasaoka, Kawasaki; Koichi Shimane, Kawasaki; Shigeru Mogi, Kawasaki; Tsuguo Yaguchi, Kawasaki; Kazuhiko Sano, Kawasaki, all of Japan

[73] Assignees: Dai Nippon Printing Co., Ltd.; Ikegami Tsushinki Co., Ltd., both of Tokyo, Japan

[21] Appl. No.: 264,421

[22] Filed: May 18, 1981

[30] Foreign Application Priority Data

May 20, 1980 [JP] Japan ................................ 55-65933

[51] Int. Cl.³ ........................ G03F 3/00; H04N 9/535

[52] U.S. Cl. ........................................ 358/76; 358/80

[58] Field of Search ........................ 358/75, 77, 80, 76

[56] References Cited

U.S. PATENT DOCUMENTS 3,128,333 4/1964 Loughlin .............................. 358/76

4,097,892 6/1978 Balding ................................ 358/80

*Primary Examiner*—Robert L. Richardson

*Attorney, Agent, or Firm*—Spencer & Kaye

[57] ABSTRACT

An apparatus for simulating a color printing process comprises a scanning unit including a table on which four color separation films formed from a color original are placed side by side, a pair of flying spot scanner tubes, four lens systems for projecting raster images of the scanner tubes onto the four color separation films and four photomultipliers for converting light rays passing through the respective films into subtractive primary color signals of cyan, magenta, yellow and black; a control unit for effecting various adjustments and correction upon the color signals and including a zero adjuster, an after image corrector, a continuous tone gamma corrector, a screen gamma corrector, a soft/-hard corrector, a negative/positive corrector, a flat etching device, a contrast adjuster, a light adjuster, a shadow adjuster and a partial adjuster; a color reproduction process unit for converting the adjusted and corrected subtractive primary color signals into additive primary color image signals of red, green and blue; and a color monitor unit for receiving the additive primary color image signals and including a color cathode ray tube for displaying a color image. The color cathode ray tube has a chrominance characteristic which can completely display the actual printing colors and has about 700 to 800 scanning lines per frame.

17 Claims, 36 Drawing Figures

Parallel Shift

Contrast Control

Light Control

Shadow Control

Partial Control

FIG. 18
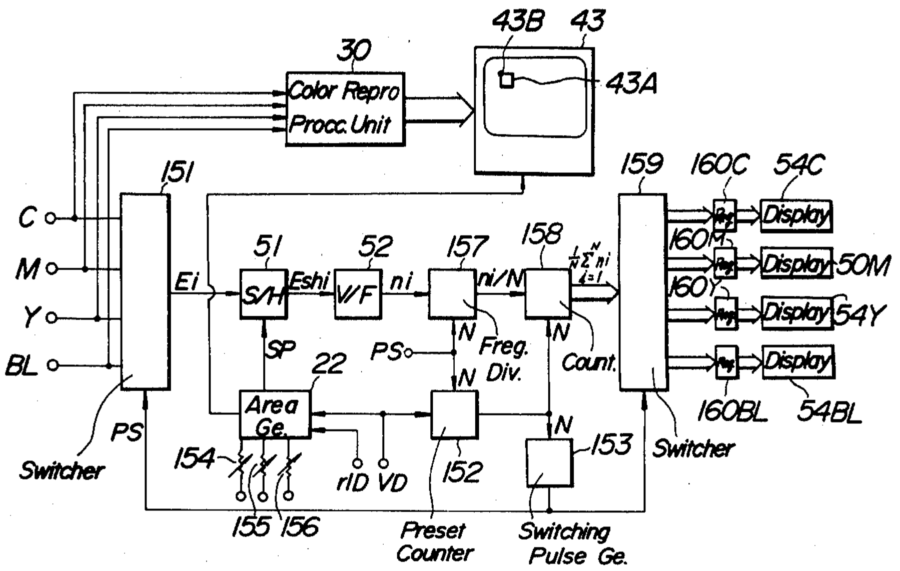
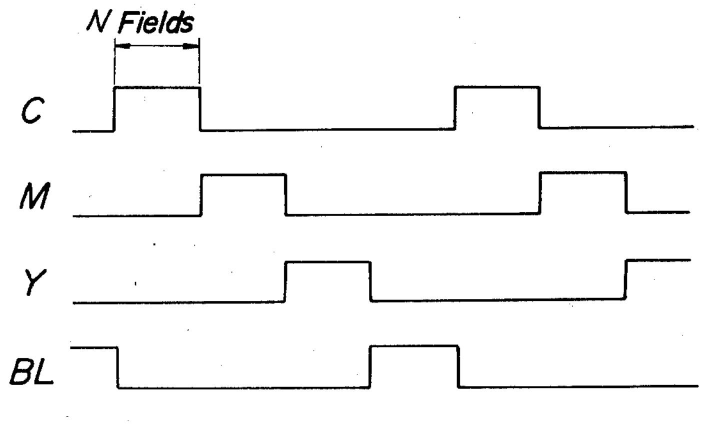
FIG. 19a
FIG. 19b
FIG. 19c
FIG. 19d

APPARATUS FOR SIMULATING COLOR PRINTING PROCESS

BACKGROUND OF THE INVENTION

The present invention relates to an apparatus for simulating a color printing process comprising a scanning unit such as a flying spot scanner with a cathode ray tube or a television camera for scanning a set of color separation films of cyan, magenta, yellow and black to derive subtractive primary color signals of cyan, magenta, yellow and black, a control and process unit for receiving the thus derived subtractive primary color signals and adjusting and processing them to derive three additive primary color signals of red, green and blue, and a color monitor unit for receiving the thus derived additive primary color signals and displaying on its screen a color image which simulates a color print image.

By means of such a simulating apparatus, while inspecting the color image displayed on the monitor screen, accurate perception and estimation of color reproduction quality, preproof study of color images, inspection of color balance, etc. can be effected and simulation of the color printing process can be carried out.

There have been developed several apparatuses for simulating the color printing process. In Japanese Patent Application Publication Nos. 4,777/76 and 40,961/79, and U.S. Pat. No. 3,128,333, such apparatuses have been disclosed. For instance, in an apparatus described in Japanese Patent Application Publication No. 4,777/76, onto four color separation films of cyan, magenta, yellow and black are projected raster images of a flying spot scanner by means of four optical systems and light rays transmitted through the respective films are separately received by photomultipliers to derive four subtractive primary color image signals of cyan, magenta, yellow and black. Then after these image signals have been suitably processed and adjusted, they are converted into three additive primary color image signals of red, green and blue which can be displayed on a color monitor for simulating the printing process or printing colors. In such an apparatus it should be taken into account that color reproduction principles are entirely different for color prints and color images on the monitor. Therefore the subtractive primary color signals obtained by scanning the set of color separation films have to be converted into the additive primary color signals usable in the color monitor. Various methods for effecting this conversion have been developed and proposed. For instance, one effective method is described in a book entitled PRINCIPLES OF COLOR REPRODUCTION written by J. H. Yule, published by JOHN WILEY & SONS, INC. In this known method there has been taken into account how to process the subtractive primary color signals in order to reproduce, on the color monitor comprising a usual color cathode ray tube, the color image which resembles the real printing colors as closely as possible. That is to say, the known methods have stressed in the case of using the normal color cathode ray tubes which have been installed in the usual color television receiver and color monitors, how to convert the subtractive primary color signals derived by scanning the set of color separation films into the color television signal. This may be also applied to the color printing process simulating apparatuses described in the above mentioned Japanese Patent Application Publication No. 40,961/79 and U.S. Pat. No. 3,128,333. These known apparatuses comprise the color monitors including the normal color cathode ray tubes. The inventors of the instant application have found after various examinations and considerations that when use is made of the normal color cathode ray tube and the subtractive primary color signals are converted into the color television signal, it is impossible to simulate the printing colors with a high fidelity. The inventors have further investigated the undesirable phenomena and found the following two major causes. In the color printing process simulating apparatus it is necessary to provide a relatively large cathode ray tube having a screen of about twenty inches, and in order to inspect precisely details of the images it is required to look at the screen from a position spaced from the screen by about 50 to 70 cms. Therefore, scanning lines are liable to be visible. In the usual television receivers, it is advisable for viewers to situate themselves in front of the receivers at a distance equal to four or five times the diameter (diagonal) of the screen. Contrary to this, in the simulating apparatus it is required for the viewer to see the screen that he be much nearer to the screen. Therefore, when the usual color cathode ray tube of 525 lines per frame for the NTSC standard system, i.e. 1.6 lines per millimeter, the scanning lines appear as distinctive lines. In such a case black lines are clearly visible between successive luminous lines and thus an operator might experience difficulty in inspecting and estimating the displayed color image. Moreover, the operator might misjudge the real colors and experience difficulty in comparison between the printing colors and the displayed color image. In this manner an accurate correction, adjustment and calibration could not be expected by means of the usual color cathode ray tube. As a result, the advantage of using the large cathode ray tube might be lost. Moreover, when the scanning lines are visible, the operator might become tired to a great extent.

Secondly, the inventors have found that the usual color cathode ray tube could never reproduce inherently the printing colors in an accurate manner. In order to simulate the printing colors completely, the color reproduction range of the color cathode ray tube should include all or substantially all of the color reproduction range of the printing colors. However, upon comparing the color reproduction regions of the color printing and the usual color cathode ray tube, it has been confirmed that green and cyan colors of the color printing could never be reproduced by the usual color cathode ray tube.

As explained above, since the known color printing process simulating apparatus includes a color cathode ray tube which has limited resolution and color reproducibility, how to improve the process for converting the subtractive primary color signals obtained by scanning the set of color separation films into the color television signal, it is impossible to reproduce the color image which simulates the printing colors with a high fidelity.

SUMMARY OF THE INVENTION

The present invention has for its object to provide a novel and useful apparatus for simulating a color printing process, which apparatus can mitigate the above drawbacks of the known apparatuses and which can reproduce the printing colors with a high fidelity including details of an image.

It is another object of the invention to provide an apparatus for simulating a color printing process in which color reproduction of a color image can be corrected or adjusted in a simple, positive and accurate manner.

It is still another object of the invention to provide a color printing process simulating apparatus which is simple in construction and can be handled easily.

According to the invention an apparatus for simulating a color printing process comprises a scanning unit for scanning optically a set of color separation films formed from a color original to derive subtractive primary color signals;

a control unit for receiving the subtractive primary color signals to effect zero adjustment, gamma correction, tone adjustment, etc.;

a color reproduction process unit for receiving the subtractive primary color signals from the control unit and for processing and converting them into additive primary color signals; and a color monitor unit for receiving the additive primary color signals and for displaying a color image on a screen of a color cathode ray tube; the improvement in which the color cathode ray tube of the color monitor unit has the number of scanning lines per frame of about 700 to 800 lines and has a color reproduction characteristic which can substantially completely reproduce printing colors.

In the simulating apparatus according to the invention, it is preferable to use a large color cathode ray tube of twenty inches having a resolution of $2.1 \sim 3$ lines per millimeter. When a screen of such high resolution is looked at from a position spaced from the screen by about 50 to 70 cms, the scanning lines are hardly visible and thus the operator can inspect accurately the printing colors including details of the images and does not become tired. The desired color reproduction of the color cathode ray tube can be realized by adding a phospher material corresponding to, for example the sulphide series $P_1$ so as to change the position of reproducible green in a chromaticity diagram. By this measure the printing colors can be reproduced accurately on the monitor screen with a very high fidelity and the simulation of the color printing process can be attained in an extremely accurate manner.

Figure 1:
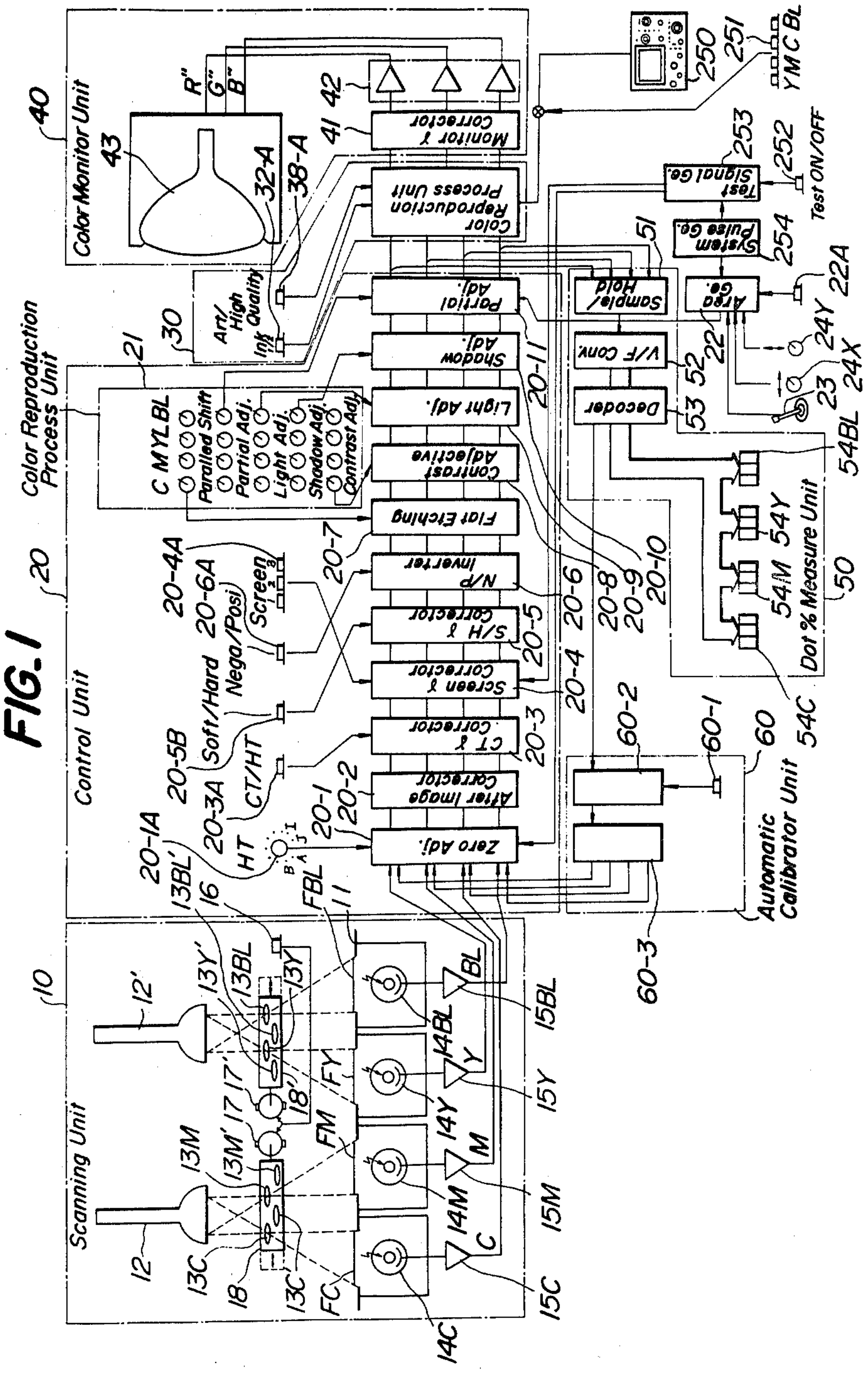
FIG. 1 is a block diagram showing an embodiment of the color printing process simulating apparatus according to the invention.
Figure 2A:
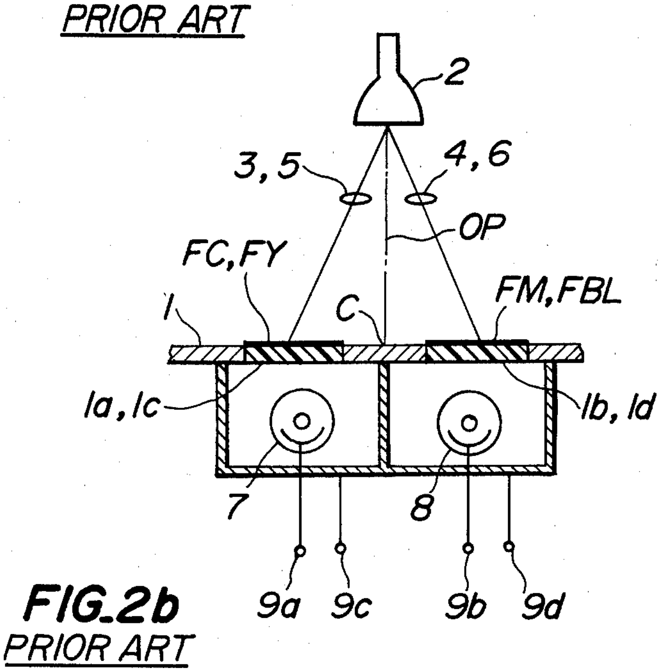
Figure 8:
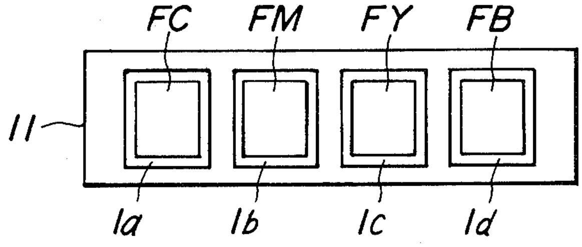
Figure 9:
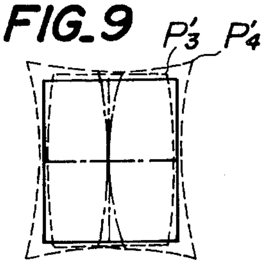
Figure 10:
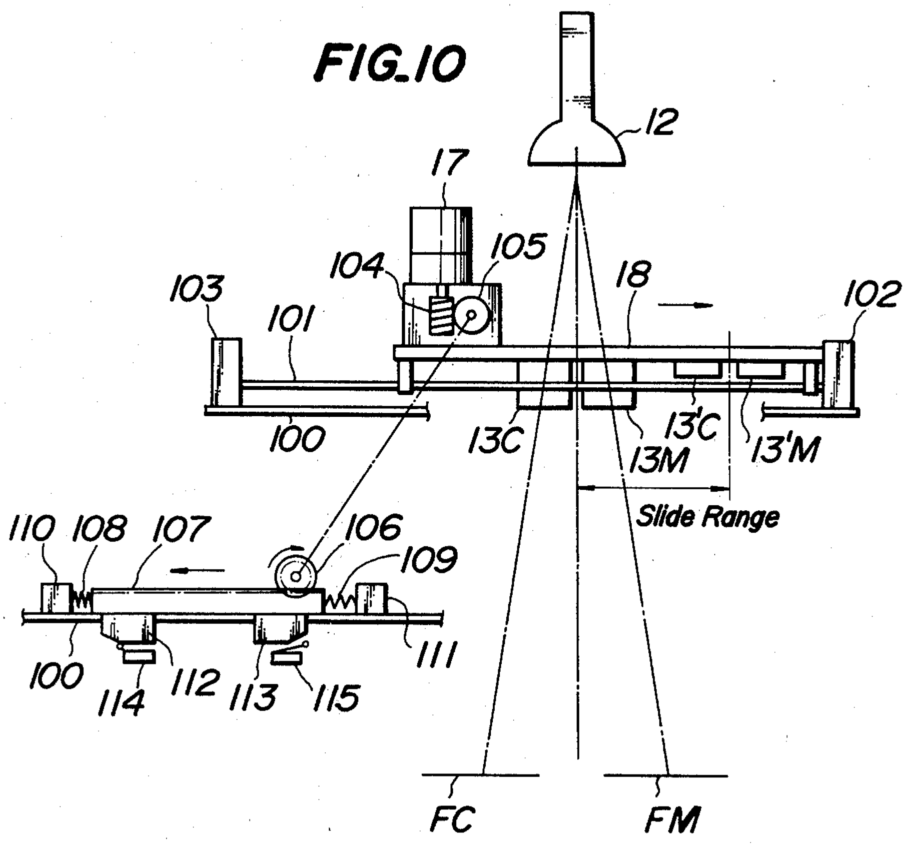
Figure 11:
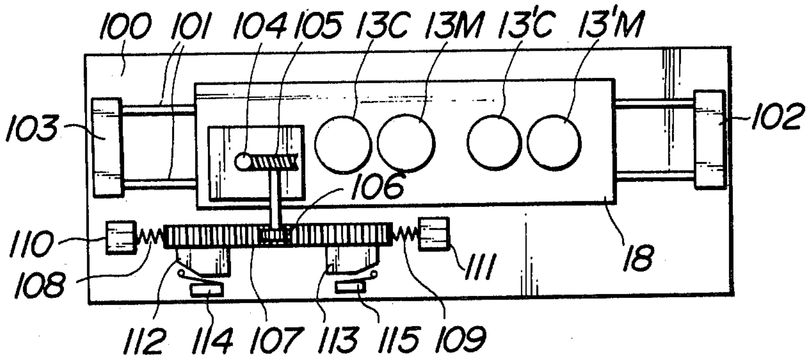
Figure 12:
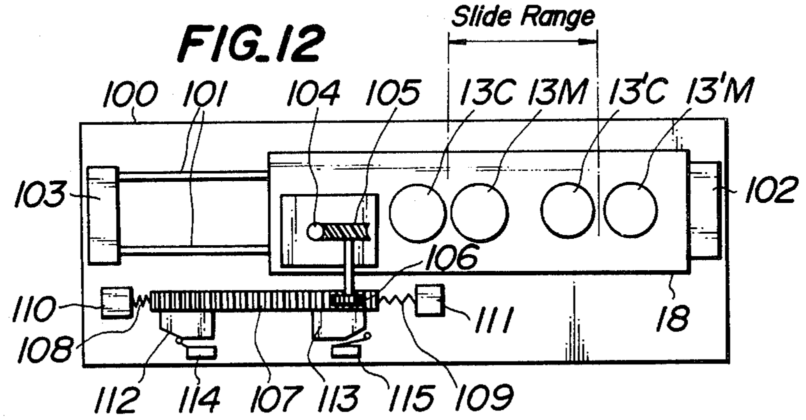
Figure 13:
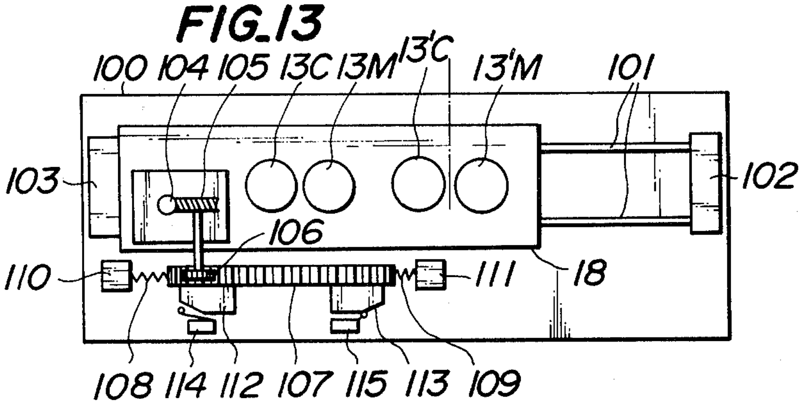
Figure 14A:
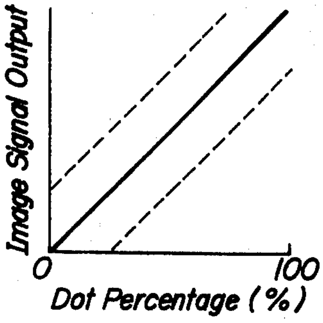
Figure 14B:
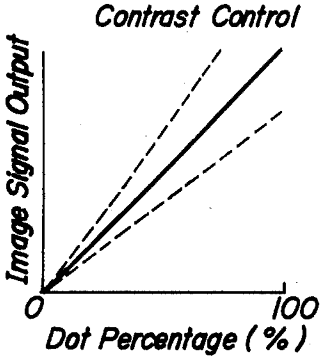
Figure 14C:
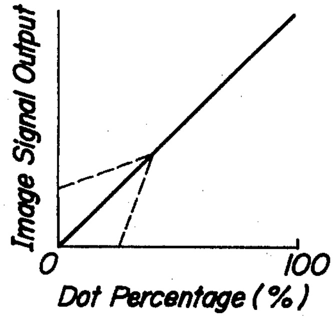
Figure 14D:
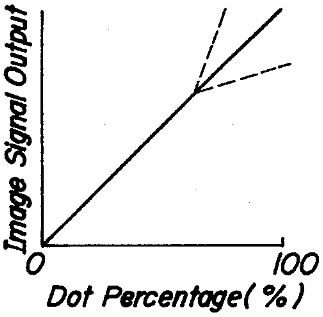
Figure 14E:
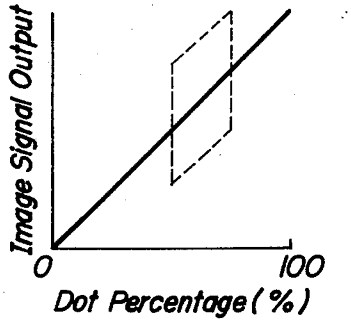
Figure 15:
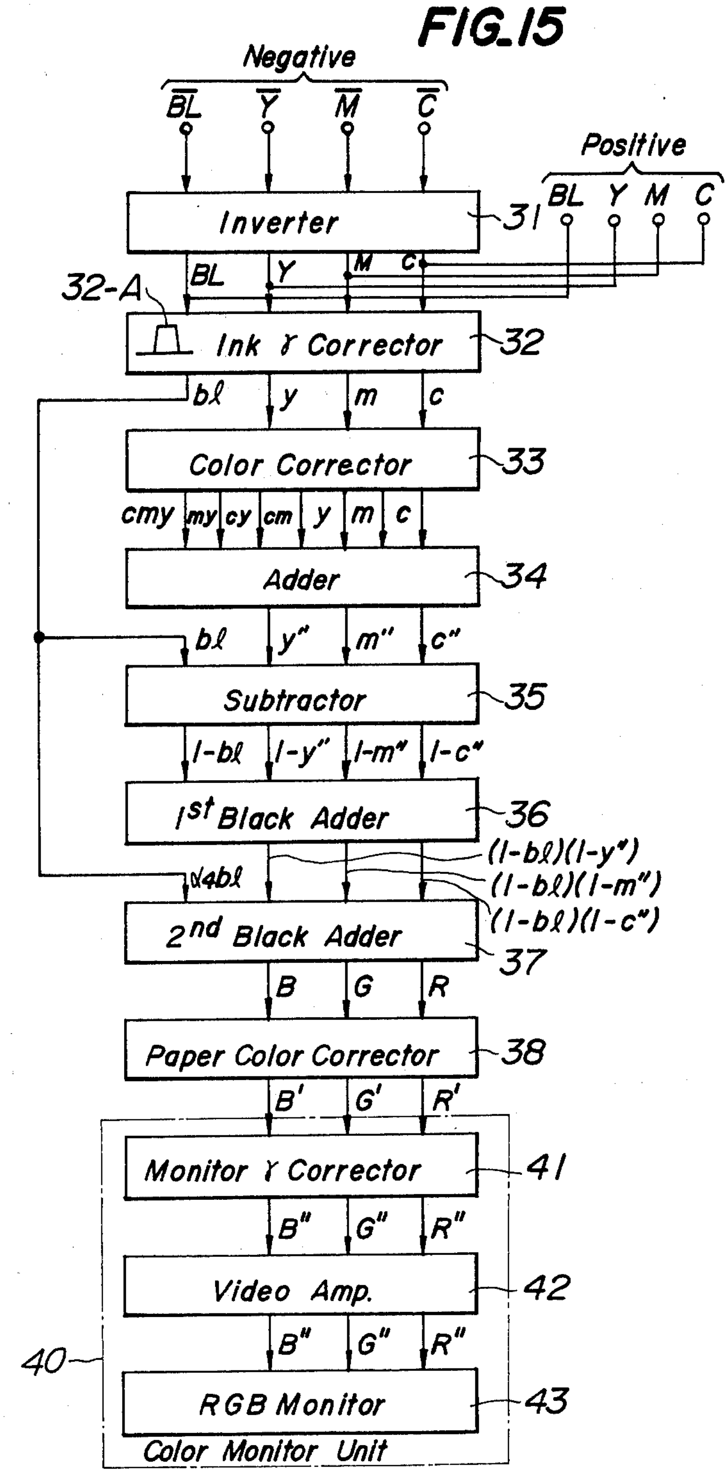
Figure 16:
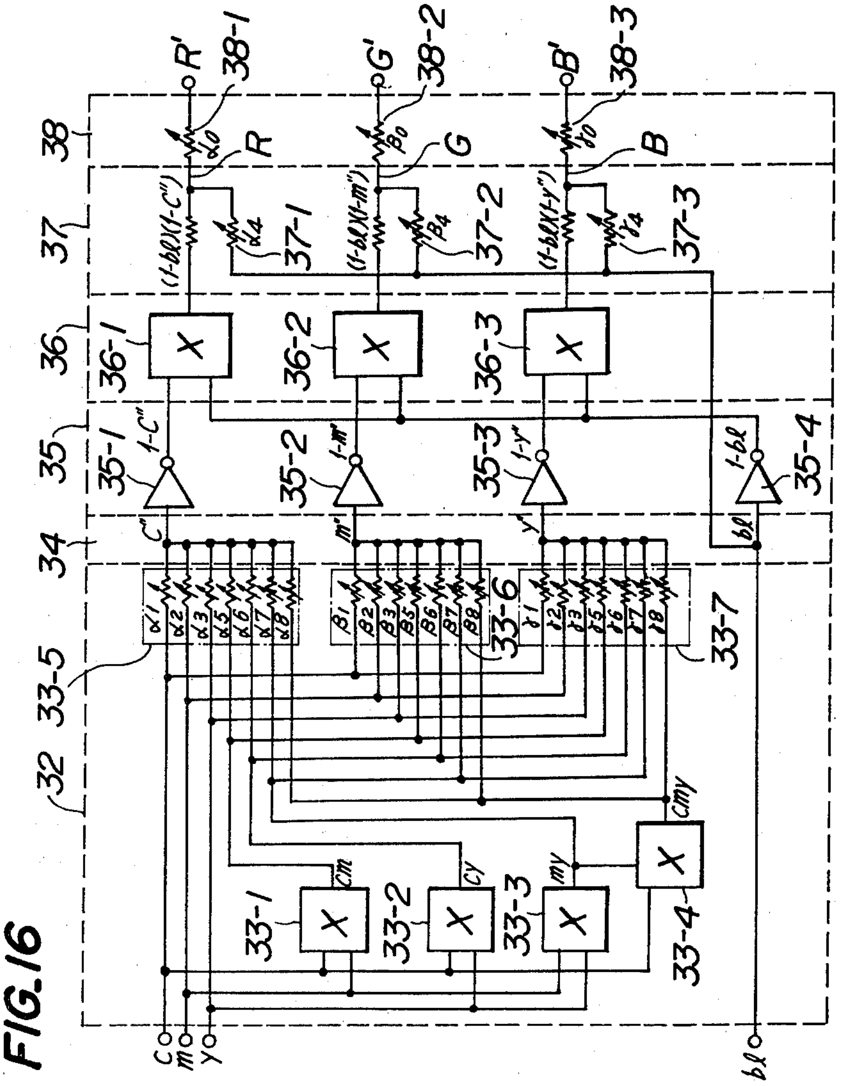
Figure 17:
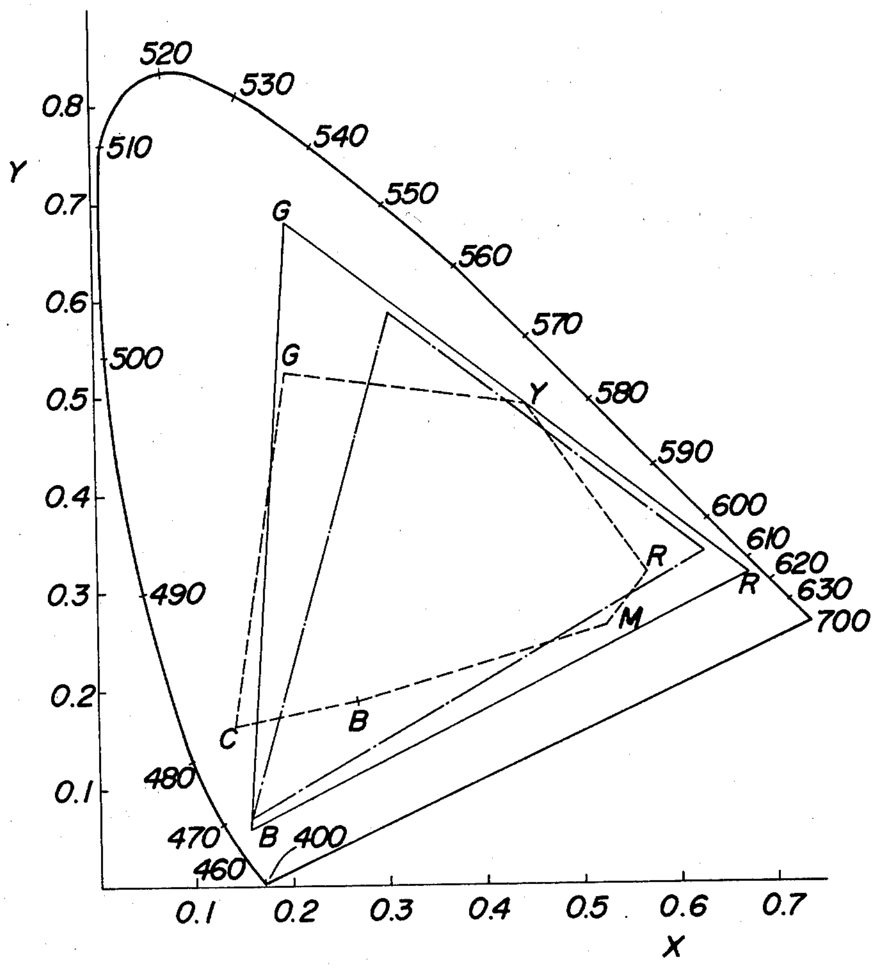
Figures 20A, 20B, 20C, 20D, 20E:
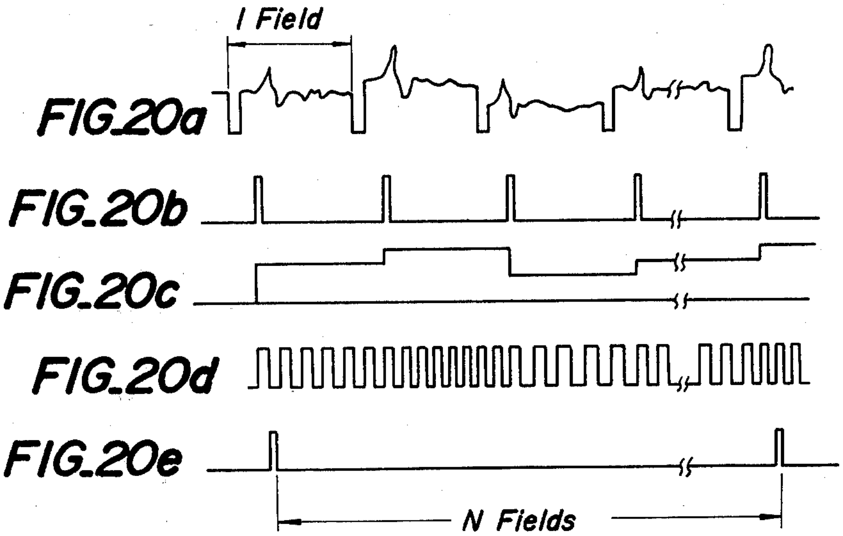
Figure 21:
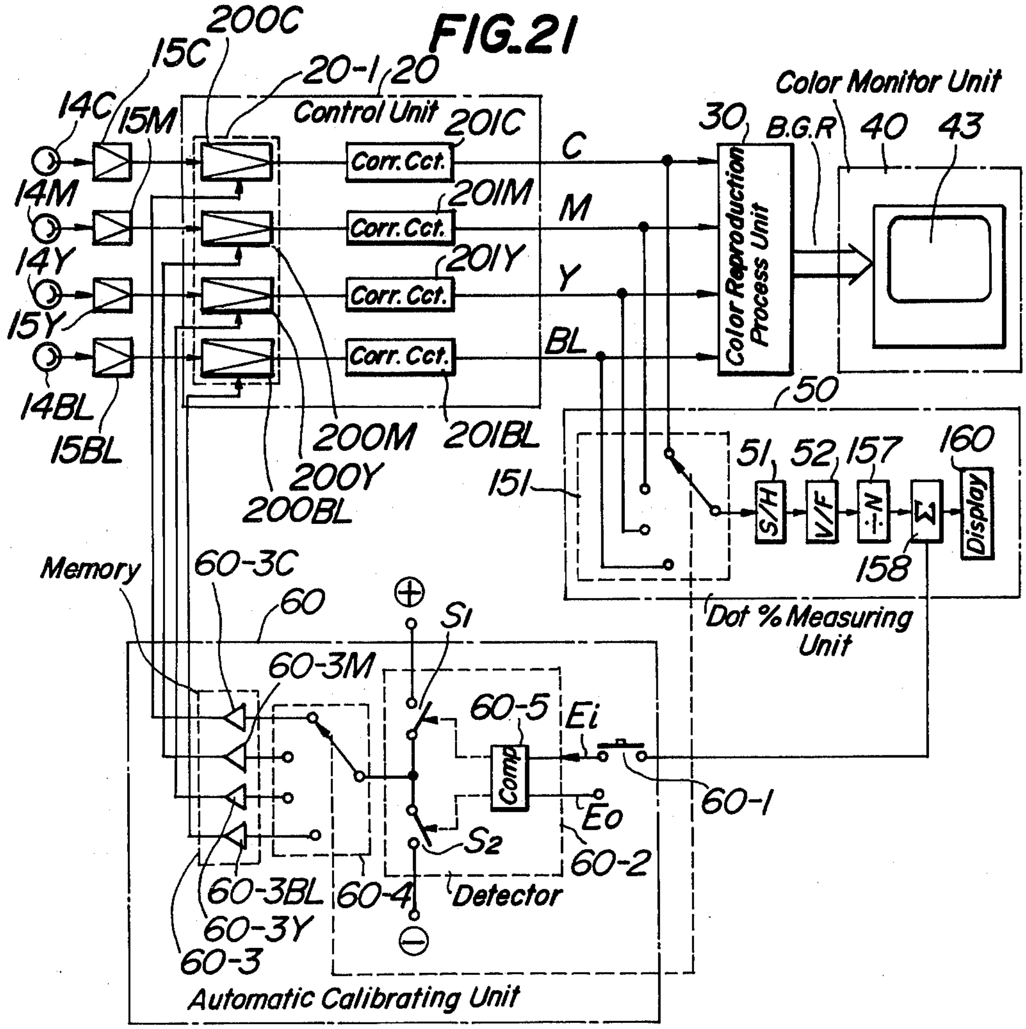
Figure 22:
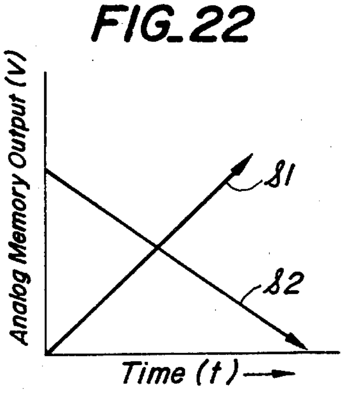
Figure 23:
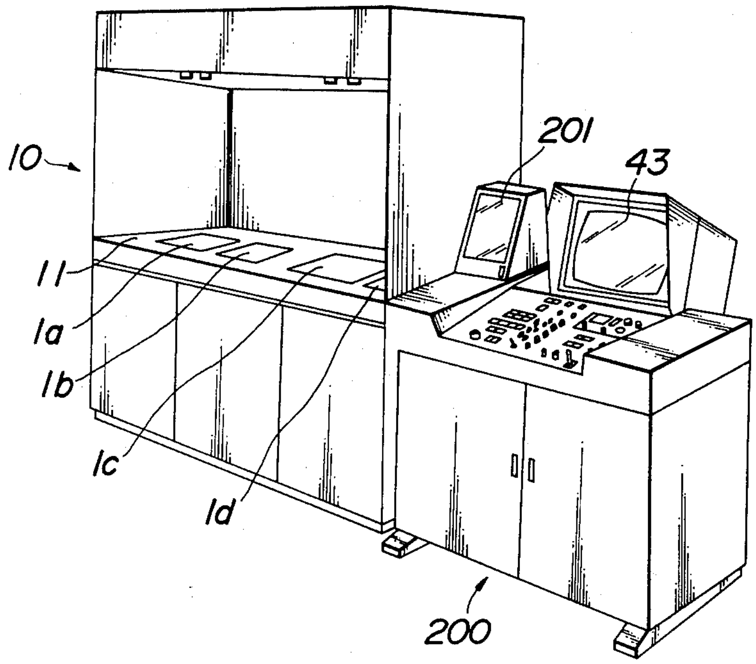
Figure 24:
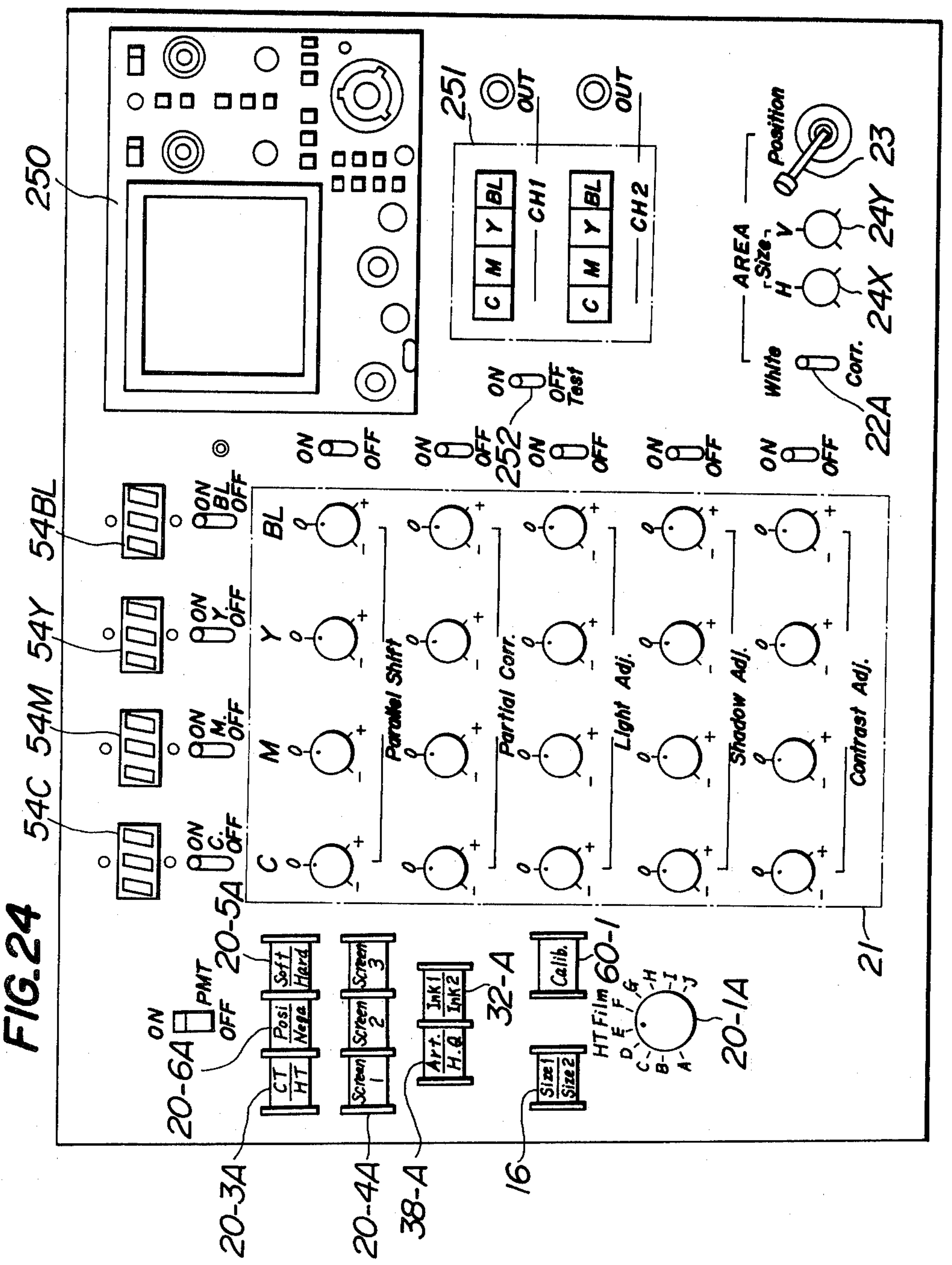

FIGS. *2a* and *2b* are cross sectional and plan views, respectively showing a known scanning unit having a single flying spot scanner;

FIGS. 3, 4, 5, 6, and 7 are schematic views for explaining the operation of the known scanning unit shown in FIG. 2;

FIG. 8 is a plan view depicting a scanning unit of the simulating apparatus according to the invention;

FIG. 9 is a schematic view for explaining the operation of the scanning unit of FIG. 8;

FIG. 10 is a side view showing a mechanism for sliding the optical system shown in FIG. 1;

FIGS. 11, 12 and 13 are plan views of the sliding mechanism for explaining the operation thereof;

FIGS. 14(a) to 14(e) are graphs illustrating various adjustments in a control unit;

FIGS. 15 and 16 are block diagram and circuit diagram, respectively showing the color reproduction process unit shown in FIG. 1;

FIG. 17 is a chromaticity diagram showing the color reproduction property of a color cathode ray tube according to the invention;

FIG. 18 is a block diagram showing the dot percentage measuring unit shown in FIG. 1;

FIGS. 19(a) to 19(d) and FIGS. 20(a) to 20(e) show waveforms for explaining the operation of the dot percentage measuring unit;

FIG. 21 is a block diagram illustrating the automatic calibration unit shown in FIG. 1;

FIG. 22 shows waveforms showing the operation of the automatic calibration unit;

FIG. 23 is a perspective view showing the outer appearance of the simulating apparatus illustrated in FIG. 1; and FIG. 24 is a plan view depicting the control panel of the simulation apparatus.

DESCRIPTION OF THE PREFERRED EMBODIMENTS

FIG. 1 is a schematic diagram showing an embodiment of an apparatus for simulating a color printing process according to the invention. The simulating apparatus comprises a scanning unit 10 comprising a flying spot scanner for scanning optically a set of four color separation films formed from a color original to be simulated to derive subtractive primary color signals of cyan, magenta, yellow and black, a control unit 20 for effecting upon the subtractive primary color signals various corrections and adjustments such as zero adjustment, after image compensation, gamma correction for simulating density characteristic of continuous tone film, screen gamma correction and various kinds of tone adjustments, a color reproduction process unit 30 for receiving the corrected and adjusted subtractive primary color signals and converting them into additive primary color signals of red, green and blue, a color monitor unit 40 for receiving the converted additive primary color signals and displaying a color image on a screen of a color cathode ray tube, a dot percentage measuring unit 50 for receiving the subtractive primary color signals of a given area in the color image and measuring the dot percentages of cyan, magenta, yellow and black colors, and an automatic calibration unit 60 for calibrating automatically the respective color signals with respect to a same standard value in order to improve the accuracy of the dot percentage measurement. Each of the above units will be explained in detail hereinafter.

Scanning Unit 10

The scanning unit 10 is to scan optically a set of four color separation films, i.e. cyan film FC, magenta film FM, yellow film FY and black film FBL, to derive four subtractive primary color signals.

Figure 2B:
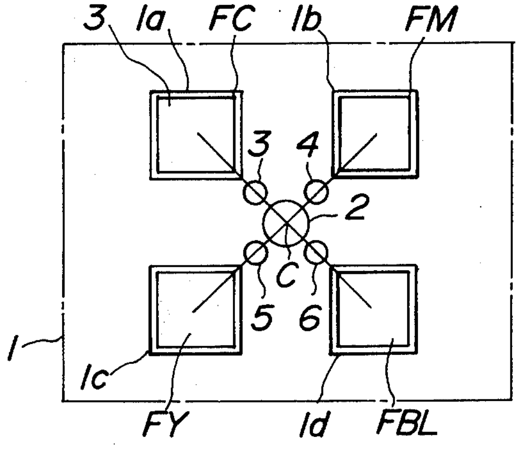
Figure 3:
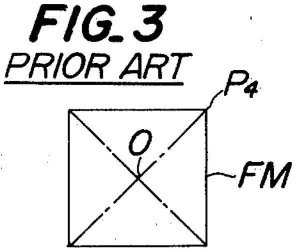

FIGS. *2a* and *2b* are diagrammatic sectional and plan views, respectively showing a known scanning unit for use in a color printing process simulating apparatus. The scanning unit comprises a film setting stage 1 including four transparent plates 1*a* to 1*d* on which four color separation films FC, FM, FY and FBL are placed, respectively, a single cathode ray tube 2 producing a scanning raster on its screen, and four lens systems 3 to 6 each for projecting an image of the scanning raster produced on the cathode ray tube screen onto respective color separation films FC, FM, FY and FBL. As shown in FIG. 2*b* the yellow, magenta, cyan and black separation films are placed on the stage 1 at four corners of a relatively large square and the cathode ray tube 2 is arranged above the stage 1 in such a manner that its optical axis OP intersects perpendicularly a middle point C of the four films, i.e. a center point of said square. The lens systems 3 to 6 are arranged between the stage 1 and the cathode ray tube 2 at such positions that they intersect lines passing between a center point of the cathode ray tube screen and center points of respective films. In this manner the scanning raster produced on the screen of cathode ray tube 2 is projected on the color separation films and these films are simultaneously scanned. Light rays passing through the respective films are received by four photoelectric converters such as photomultipliers (in the drawing only two photomultipliers 7 and 8 are shown). In this manner primary color signals of yellow, magenta, cyan and black are simultaneously derived at output terminals 9*a*, 9*b*, 9*c* and 9*d*, respectively.

Figure 4:
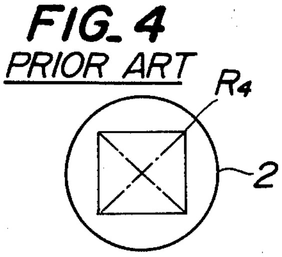
Figure 5:
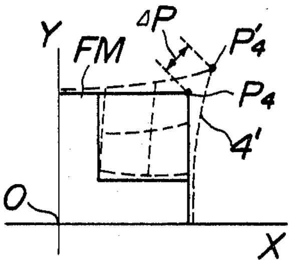

Now the optical system of the known flying spot scanner will be considered with reference to FIGS. 3 to 7. Since a principal optical axis of the lens 4 for projecting the raster image onto the color separation film of magenta FM is greatly inclined in both the X and Y directions, a corner point $P'_4$ of projected raster image 4' which point corresponds to a corner point $R_4$ of the raster on the cathode ray tube 2 shown in FIG. 4 is deflected from a corresponding corner point $P_4$ of the film FM by an amount $\Delta P$ as illustrated in FIG. 5. This is applied to all the raster images projected on the color separation films FC, FM, Fy and FBL and the following equation can be derived.

$$P'n = Pn \pm \Delta P (n = 2,3,4,5)$$

Figure 6:
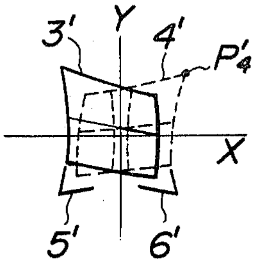

In a usual lens, the scanning raster formed on the cathode ray tube 2 is projected with distortion in a pin cushion mode and thus, the scanning raster image 4' projected on the color separation film FM is distorted as shown in FIG. 5. The distortion of the raster images 3' to 6' projected on the four films appear symmetrically with respect to a center point O. Therefore when these raster images 3' to 6' are superimposed on each other, they deviate from each other as illustrated in FIG. 6. It should be noted that in FIG. 6, only the corner parts of the raster images 3' and 4' projected on the films FC and FM are shown for the sake of clarity.

Figure 7:
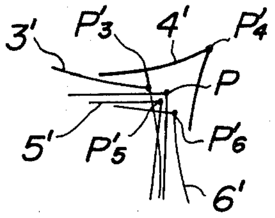

FIG. 7 shows an enlarged configuration of the superimposed raster images 3' to 6' at one corner. In this manner the corner points $P'_3$ to $P'_6$ of the four projected raster images 3' to 6' do not coincide with each other and a large registration error is produced. Therefore, reproduced colors at the corner portions of the color image displayed on the color monitor become entirely different from colors of the original and accurate simulation could not be effected.

The above mentioned distortion and registration errors become larger when the scanning is at a higher speed and density. In the color printing process simulating apparatus comprising a cathode ray tube which has 40 percent more scanning lines than the usual cathode ray tube used in color television receivers, it is extremely undesirable for the projected raster images to deviate from each other.

In order to obviate the above mentioned drawback it has been proposed to provide four cathode ray tubes and the four color separation films are scanned by respective cathode ray tubes. In this case the above distortion of the projected raster images and the registration error can be removed, but it is quite difficult to register the four rasters and the scanner becomes large in size and very expensive.

Consideration has been further given to providing one or two cathode ray tubes and a plurality of half mirrors and reflection mirrors, and a light beam from the cathode ray tube being divided into two or four beams and the divided beams being perpendicularly projected on two or four color separation films. In such a scanner, the number of cathode ray tubes and the distortion and registration error of the raster images may be reduced. However, the intensity of the scanning beam is reduced to a great extent and the signal to noise ratio of the primary color signals will be decreased to an inadmissible extent.

In the scanning unit 10 of the present embodiment, in order to avoid the drawbacks of the known scanners and to reduce distortion of raster images projected on color separation films at corner portions, there are provided a first scanning optical system arranged above the first and second color separation films and a second optical scanning system arranged above the third and fourth color separation films.

Further the four color separation films are arranged side by side equidistantly and thus, an operator can easily handle the color separation films.

Usually the color separation films are not square, but rectangular. Therefore, by arranging the rectangular films in a row with their long sides adjacent to each other, the angle between light paths passing through the first and second lens systems and the angle between light paths passing through the third and fourth lens systems can be made smaller and the distortion and registration errors can be further reduced. Moreover, the whole scanner can be made smaller in size.

As illustrated in FIG. 1 the scanning unit 10 of this embodiment comprises a flat stage 11 having first, second, third and fourth rectangular transparent sections on which are placed the color separation films FC, FM, FY and FBL of cyan, magenta, yellow and black. These four transparent sections are arranged in a row with their long sides adjacent to each other so as to set the four color separation films as close as possible to each other as shown in FIG. 8. Therefore, the whole flying spot scanner can be made smaller in size and an operator can treat the films easily.

A first optical scanning system comprises a first cathode ray tube 12, i.e. a first flying spot tube for producing a first scanning raster on its screen. The tube 12 is so arranged that its optical axis intersects perpendicularly the film setting stage 11 at a middle point between the adjacent first and second transparent sections. The first optical scanning system further comprises first and second lens systems 13C and 13M arranged between the first flying spot tube 12 and the first and second color separation films FC and FM, respectively in such a manner that light paths extending from the center of the tube 12 to centers of the first and second films, respectively pass the lens systems 13C and 13M, respectively. The lens systems 13C and 13M are so arranged that their principal planes are parallel with film setting stage 11.

A second optical scanning system has the same construction as that of the first scanning system and comprises a second flying spot tube 12' having an optical axis which intersects perpendicularly the stage 11 at a middle point between the third and fourth color separation films FY and FBL, and third and fourth lens systems 13Y and 13BL for projecting a second raster produced on a screen of the second tube 12' onto the films FY and FBL, respectively.

According to the present embodiment since each of the cathode ray tubes 12 and 12' is used only for two color separation films FC, FM and FY, FBL and these two films can be arranged closer to each other, the deflection angle can be made smaller. Therefore, the distortion of the two raster images projected on the color separation films FC and FM; FY and FBL can be materially reduced in the Y direction and there remains only a slight distortion in the X direction as illustrated in FIG. 9.

As explained above, in the flying spot scanner of the present embodiment, by adding only one flying spot tube to the known scanner having a single flying spot tube and two paired color separation films which are scanned by respective tubes, the distortions of the projected raster images in the Y direction can be substantially avoided. Further since the paired color separation films can be arranged side by side closer to each other, the deflection angle can be made smaller and thus, the distortion of the projected raster images can be materially reduced. In this manner the registration error of color images displayed on a color monitor screen can be reduced to a great extent even at the corner portions and very precise color reproduction can be effected.

By driving the first and second flying spot tubes 12 and 12' in synchronism with each other, the first raster produced on the screen of the first flying spot tube 12 is projected onto the first and second color separation films FC and FM and the second raster on the screen of the second flying spot tube 12' is projected on the third and fourth color separation films FY and FBL and thus, the four color separation films are scanned simultaneously. Light rays passing through the films FC, FM, FY and FBL are received by photomultipliers 14C, 14M, 14Y and 14BL, respectively which produce subtractive primary color signals of yellow, magenta, cyan and black at output terminals. In this embodiment, in order to improve S/N of these color signals as well as to reduce shadings, these photomultipliers are arranged symmetrically with respect to the optical axes of the tubes 12 and 12', respectively. The color signals are amplified in preamplifiers 15C, 15M, 15Y and 15BL and are further supplied to the control unit 20.

In the scanning unit 10 of the present embodiment, there are provided two kinds of projection lenses 13C, 13M, 13Y, 13BL and 13C', 13M', 13Y', 13BL' having different projecting magnifications in order to scan two kinds of color separation films of different sizes. These lenses can be selectively inserted into the optical paths by operating a size change switch 16. To this end there are provided first and second lens mounting members 18 and 18' which are linearly driven by motors 17 and 17', respectively. The lenses 13C, 13M, 13C' and 13M' are secured to the first member 18 and the lenses 13Y, 13BL, 13Y' and 13BL' are mounted on the second member 18'.

FIG. 10 illustrates a side view of a mechanism for driving the lens mounting member 18 and FIGS. 11, 12 and 13 are plan views thereof. As shown in FIG. 10 the lenses 13C, 13M and 13C' and 13M' are mounted on the member 18 and project the raster images of different sizes onto the color separation films FC and FM. The whole device is mounted on a fixed plate 100 and the member 18 is movably supported by a guide rail 101 and can be reciprocally moved between stoppers 102 and 103. To the driving motor 17 for moving the member 18 is connected a worm gear 104 which is engaged with a worm wheel 105. To the shaft of the worm wheel 105 is secured a pinion gear 106 which is engaged with a movable rack 107. To the right and left ends of the rack 107 are connected one end of each of coiled springs 108 and 109, respectively, the other ends of which are secured to fixed blocks 110 and 111, respectively. In FIG. 11, the lens mounting member 18 is situtated at a middle point. When the motor 17 is driven in one direction and the pinion 106 is rotated in one direction, the lens mounting member 18 moves rightward owing to the fact that the rack 107 is substantially fixed by the coiled springs. When the member 18 arrives at the right hand stopper 102 as illustrated in FIG. 12, the lens mounting member 18 is stopped, but since the motor 17 is still rotating and the pinion 106 is still rotating, the movable rack 107 is driven leftward, so that the coiled spring 108 is compressed and the coiled spring 109 is extended. After the movable rack 107 has been moved by a given distance, a microswitch 114 is actuated by a cam plate 112 and the motor 17 is deenergized, and then the motor is stopped after a small rotation due to its inertia. Since the worm 104 and worm wheel 105 could not be rotated in the reverse direction, the movable rack 107 is stopped at the extreme left hand position, and the lens mounting member 18 resiliently urged against the stopper 102 by means of the coiled springs 108 and 109. The distance over which the rack 107 moves from the instant of time at which the motor 17 is deenergized to the instant of time at which the motor 17 is stopped, is a range within which the coiled springs 108 and 109 are compressed and expanded. Therefore, it is not necessary at all to determine precisely the deenergization timing of the motor 17 and no adjustment is required. Further, since the lens mounting member 18 is urged against the stopper 102 in a positive manner, the stop position is precisely determined.

Upon energizing the motor 17 to rotate in the other direction, the lens mounting member 18 is moved in the other direction and at last is urged against the stopper 103. Then a microswitch 115 is actuated by a cam plate 113 and the motor 17 is deenergized. In this manner the lenses are moved to the position shown in FIG. 13.

In the present embodiment, combination of the worm and worm wheel and the combination of the pinion and rack are used as the feeding device. However, it should be noted that only other mechanism such as a combination of a half nut and a guide screw may be used. When the worm and worm wheel are used, since the driving force is exclusively transferred from the worm to the worm wheel, it is not necessary to provide a ratchet mechanism to inhibit reverse rotation. But if another type of mechanism is used, it will be necessary to provide a member for preventing reverse rotation. Further, the microswitches and cam plates secured to the movable rack for controlling the energization of the driving motor may be provided at any other positions of the device or may be replaced by any other switching mechanism. Moreover, in the above embodiment, a pair of coiled springs are provided at both sides of the movable rack, but either one of these springs may be omitted or any other resilient member may be used instead of the springs.

As described above in detail, by means of the simple construction in which the resilient member is provided at one or both sides of the movable member, the lens mounting member can be stopped in position while being resiliently urged against the stoppers, and thus the lens mounting members 18 and 18' can be precisely stopped at the predetermined positions without any distortion or play during a long time period. Further, the stop positions can be maintained stably and positively under vibration. Moreover, variation in the timings of deenergization of the driving motors 17 and 17' and movement due to inertia of the lens mounting members and motors can be compensated for by the compression and expansion of the coiled springs, and thus a critical adjustment is not required and the device can work satisfactorily immediately after assembling.

Control Unit 20

Next the control unit 20 will be explained. Since various adjustments and corrections to be effected in this control unit 20 are known, the unit 20 will be explained briefly. The control unit 20 comprises a zero adjuster 20-1, an after image corrector 20-2, a gamma correcting device 20-3 for color separation films of continuous tone, a screen gamma selector 20-4, a soft/-hard gamma correcting device 20-5, a negative/positive inverter 20-6, a flat-etching device 20-7, a contrast adjuster 20-8, a light adjuster 20-9, a shadow adjuster 20-10 and a partially correcting (etching) device 20-11.

The zero adjuster 20-1 comprises a selection switch 20-1A having ten positions A to J, and gain adjusters, the gains of which are controlled by the switch 20-1A. When using color separation half tone (dot) films, the gain is adjusted in accordance with the density of the film base so that the gain of the image signal obtained by scanning the film base, i.e. the area without color has such a value that the dot percentage becomes zero.

The after image compensator 20-2 is to compensate the after image characteristics of the cathode ray tubes 12 and 12' of the flying spot scanner for scanning the color separation films.

The CT gamma corrector 20-3 is to effect a given gamma correction in case of using the color separation films of continuous tone. In case of using the films of half tone type, the image signals are not passed through this CT gamma corrector by means of a switch 20-3A.

The screen gamma corrector 20-4 comprises a selection switch 20-4A having three positions, which are selected in accordance with the type of screen which has been used for producing the color separation films of half tone. In this manner the gamma correction is carried out in accordance with the respective screens.

The soft/hard gamma corrector 20-5 comprises a selection switch 20-5B by means of which a gamma correction for soft dot color separation films (having non-sharp contour) or a gamma correction for hard dot color separation films (having sharp contour) can be selectively carried out.

The negative/positive inverter 20-6 comprises a switch 20-6A which is so actuated that inverted image signals $\overline{C}$, $\overline{M}$, $\overline{Y}$ and $\overline{BL}$ can always be obtained regardless of whether negative or positive color separation films are used. That is to say, in case of using the negative films, the image signals are passed without inversion, but in case of the positive films, the signals are inverted.

The flat etching device 20-7, contrast adjuster 20-8, light adjuster 20-9, shadow adjuster 20-10 and partial adjuster 20-11 are provided for effecting given corrections of printing tone or gradiation and comprise a set of twenty adjusting dials 21. By mean of these dials it is possible to adjust mutual relations between the amounts of the image signals and dot percentages as shown in FIGS. 14(*a*) to 14(*e*). As illustrated in FIG. 14(*e*), any desired area in the image can be selectively corrected. To this end position and size of this area can be denoted by an area generator 22 (see FIG. 1), a lever 23 (see also FIG. 1) for denoting a center position of the area and two dials 24X and 24Y (see FIG. 1) for denoting dimensions in the X and Y directions.

Color Reproduction Process Unit 30

Next the color reproduction process unit 30 will be explained in detail.

Heretofore, there have been proposed several color reproduction systems in accordance with basic color reproduction theory. The present unit has been designed on the basis of the Neugebauer theory which treats the color reproduction with half tone. The color reproduction based on the Neugebauer theory can be realized in various ways in accordance with methods of expressing theoretical equations and manners for processing signals. For instance, in an embodiment described in Japanese Patent Publication Nos. 4,777/76 and 5,305/76, four color separation films of cyan, magenta, yellow and black are scanned by a cathode ray tube scanner to derive color image signals and then these color image signals are processed to produce four subtractive primary color signals of cyan, magenta, yellow and black, three additive primary color signals of red, green and blue, a tertiary color signal and a signal representing color of papers to be used. These nine signals are then multiplied by suitable coefficients which differ for inks and papers to be used and other elements as well as for three stimulative values of a color video image reproduced on a monitor screen. Finally these signals are totally summed up for respective stimulative values. In this method in order to produce the above mentioned nine signals there must be provided eight logarithmic conversion circuits, nine summing circuits and nine exponential amplifiers or twenty four multiplying circuits. As compared with the summing circuit, the multiplying circuit is much more complicated and is liable to generate error and thus, it is preferable to reduce the number of multiplying circuits. It should be further noted that in the known methods since the number of elements to be adjusted is large, it is rather difficult to correct or adjust the colors of the displayed image in a simple and accurate manner.

The color reproduction process unit 30 of the present embodiment can provide a novel and useful means for reproducing a color image displayed on a color monitor screen, in which the color reproduction of the color image can be corrected or adjusted in a simple, positive and accurate manner.

The inventors of the present invention have recognized the fact that the process unit 30 can be obtained by constructing a color reproducing circuit on the basis of equations representing red, green and blue colors of the additive mixture principle by adopting the Neugebauer equations and modifying these equations in such a manner that the circuit construction becomes simpler from a practical view point.

The color reproduction process unit 30 can reproduce a color image on a screen of a color monitor for simulating a color printing process by adjusting the amplitudes of the signal expressing paper color, the primary color signals, the secondary color signals, the tertiary color signal and the primary color signal of black in this order independently from each other.

The principle of the color reproducing method of the present color reproduction process unit 30 will be first explained theoretically. Now it is assumed that c, m, y and bl are percentages of halftone dot areas obtained from halftone type color separation films of cyan, magenta, yellow and black, respectively; Rc, Rm, Ry and Rbl are reflectances, measured with red light, of cyan, magenta, yellow and black inks, respectively as denoted by suffixes c, m, y and bl; and Rcm, Rmy, Rcy, Rcbl, Rmbl, Rybl, Rcmy, Rmybl, Rcybl and Rcmybl are reflectances, measured with red light, of combinations of cyan, magenta, yellow and black inks as denoted by suffixes. For instance, Rmy is a reflectance, measured with red light, of magenta ink printed over yellow ink. Then the total reflectance for the red light can be expressed by the following equation.

$$\begin{aligned} R = {} & (1-c)(1-m)(1-y)(1-bl) + \\ & c(1-m)(1-y)(1-bl)Rc + m(1-c)(1-y)(1-bl)Rm + \\ & y(1-c)(1-m)(1-bl)Ry + bl(1-c)(1-m)(1-y)Rbl + \\ & my(1-c)(1-bl)Rmy + cy(1-m)(1-bl)Rcy + \\ & cm(1-y)(1-bl)Rcm + mbl(1-c)(1-y)Rmbl + \\ & cbl(1-m)(1-y)Rcbl + ybl(1-c)(1-m)Rybl + \\ & cmy(1-bl)Rcmy + mybl(1-c)Rmybl + cmbl(1-y)Rcmbl + \\ & cybl(1-m)Rcybl + cmybl \cdot Rcmybl \end{aligned} \tag{1}$$

In the above equation (1) each of the reflectances Rcbl, Rmbl, Rybl, Rcmbl, Rmybl, Rcybl and Rcmybl may be assumed to be equal to the reflectance Rbl of the black ink and the above equation can be simplified to the following equation (2).

$$R = (1-bl)\{1-(\alpha_1 \cdot c + \alpha_2 \cdot m + \alpha_3 \cdot y - \alpha_5 \cdot cm - \alpha_6 \cdot cy - \alpha_7 \cdot my - \alpha_8 \cdot cmy)\} + \alpha_4 \cdot bl \tag{2}$$

$$\equiv (1-bl)(1-c'') + \alpha_4 \cdot bl \tag{2'}$$

Wherein, $\alpha_1 = 1-Rc$, $\alpha_2 = 1-Rm$, $\alpha_3 = 1-Ry$, $\alpha_4 = Rbl$, $\alpha_5 = 1-Rc-Rm+Rcm$, $\alpha_6 = 1-Rc-Ry+Rcy$, $\alpha_7 = 1-Rm-Ry+Rmy$, $\alpha_8 = 1-Rc-Rm-Ry+Rcm+Rcy+Rmy$ In order to simulate color of paper, the above equation (2) is modified in the following equation (3) by multiplying by $\alpha_0$.

$$R' = (1-bl)\{\alpha_0 - (\alpha'_1 \cdot c + \alpha'_2 \cdot m + \alpha'_3 \cdot y - \alpha'_5 \cdot cm - \alpha'_6 \cdot cy - \alpha'_7\, my - \alpha'_8 \cdot cmy)\} + \alpha'_4 \cdot bl \tag{3}$$

$$= (1-bl)(\alpha_0 - c_1'') + \alpha'_4 \cdot bl \tag{3'}$$

Wherein, $\alpha_1' = \alpha_0\alpha_1$, $\alpha_2' = \alpha_0\alpha_2$, $\alpha_3' = \alpha_0\alpha_3$, $\alpha_4' = \alpha_0\alpha_4$, $\alpha_5' = \alpha_0\alpha_5$, $\alpha_6' = \alpha_0\alpha_6$, $\alpha_7' = \alpha_0\alpha_7$, $\alpha_8' = \alpha_0\alpha_8$ In a similar manner the following equations may be derived for green G and blue B colors.

$$G = f(\beta) \tag{4}$$

$$B = f(\gamma) \tag{5}$$

In the above equation (3), $\alpha_0$ in the term within round brackets represents the color of the paper and $\alpha_1'\cdot c$, $\alpha_2'\cdot m$ and $\alpha_3'\cdot y$ represent primary cyan, magenta and yellow colors, respectively, $\alpha_5'\cdot cm$, $\alpha_6'\cdot cy$ and $\alpha_7'\cdot my$ denote secondary blue, green and red colors, respectively, $\alpha_8'\cdot cmy$ expresses a tertiary color of black, and $\alpha_4'\cdot bl$ represents black. To the equations (4) and (5) expressing the remaining green and blue colors the same may be applied. Therefore, by suitably adjusting the following coefficients for the respective color signals, it is possible to simulate or correct respective colors independently of each other.

| | |
|---|---|
| paper color | $(\alpha_0, \beta_0, \gamma_0)$ |
| primary colors | $(\alpha'_1, \alpha'_2, \alpha'_3, \beta'_1, \beta'_2, \beta'_3, \gamma'_1, \gamma'_2, \gamma'_3)$ |
| Secondary colors | $(\alpha'_5, \alpha'_6, \alpha'_7, \beta'_5, \beta'_6, \beta'_7, \gamma'_5, \gamma'_6, \gamma'_7)$ |
| Tertiary color | $(\alpha'_8, \beta'_8, \gamma'_8)$ |
| Black | $(\alpha'_4, \beta'_4, \gamma'_4)$ |

When an electric circuit is to be composed on the basis of the above equations, cm, cy, my of secondary colors and cmy of tertiary color in the equation (2) are derived by means of multiplying circuits and then c'' in the equation (2') is derived by a summing circuit after adjustments for the coefficients $\alpha_1$ to $\alpha_3$ have been effected. Next a calculation of (1−c'') is carried out by an inverter and then (1−c'') is multiplied by (1−bl) in a multiplying circuit.

Then the product of (1−c'')·(1−bl) is added to $\alpha_4\cdot bl$ in a summing circuit and finally the whole is multiplied by $\alpha_0$ in an adjuster so as to obtain the primary color signal of red. For green and blue colors similar circuits may be provided, but the circuits for producing the secondary colors cm, cy and my and the tertiary color cmy may be common for red, green and blue. Therefore, the number of necessary multipliers is seven, i.e. four for producing the secondary and tertiary colors and three for effecting multiplication with (1−bl) for respective red, green and blue color signals.

FIG. 15 is a block diagram showing the color reproduction process unit 30. At first, halftone type color separation negatives of cyan, magenta, yellow and black formed from a color original are scanned by a cathode ray tube scanner or a color television camera to derive color dot signals $\overline{C}$, $\overline{M}$, $\overline{Y}$ and $\overline{BL}$ of respective colors. These signals are supplied to an inverter 31 and are converted into positive color dot signals C, M, Y and BL. In order to satisfy the Neugebauer equations for color reproduction it is necessary to consider additivity and proportionality of densities described in chapter 8 of PRINCIPLES OF COLOR REPRODUCTION written by J. H. Yule. In color printing linear proportionality is lost in accordance with an increase in dot areas mainly due to blurring of the inks. The color dot signals C, M, Y and BL are supplied to an ink gamma correction circuit 32 so as to compensate for the undesired linear proportionality by means of an ink selection switch 32-A. Then, mathematical operations by means of signal process circuits can be effected satisfactorily. Output signals from the ink gamma correction circuit 32 are denoted by c, m, y and bl. These signals c, m, y and bl are then supplied to a color corrector 33 which comprises four multipliers 33-1 to 33-4 as shown in FIG. 16 and produces secondary color signals cm, cy and my and a tertiary color signal cmy. The color corrector 33 further comprises three sets of variable resistors 33-5, 33-6 and 33-7; by means of which amplitudes of the color signals c, m, y, cm, cy, ym and cmy are adjusted to control or correct the coefficients $\alpha_1 \sim \alpha_3$, $\alpha_5 \sim \alpha_8$; $\beta_1 \sim \beta_3$, $\beta_5 \sim \beta_8$; and $\gamma_1 \sim \gamma_3$, $\gamma_5 \sim \gamma_8$; respectively. These coefficients are all smaller than unity. Output signals from the respective sets of variable resistors are summed up in a summing circuit 34 to produce signals $c''$, $m''$ and $y''$. By adjusting the variable resistors it is also possible to correct any decrease in tone at transients from the secondary color of high density to the tertiary color. The output signals $c''$, $m''$ and $y''$ from the summing circuit 34 as well as the black signal bl from the circuit 32 are supplied to a subtracting circuit 35 which comprises inverters 35-1 to 35-4 for producing inverted output signals $(1-c'')$, $(1-m'')$, $(1-y'')$ and $(1-bl)$. These signals are then supplied to a first black adder 36 which comprises three multipliers 36-1 to 36-3 for generating output product signals $(1-bl)\cdot(1-c'')$; $(1-bl)\cdot(1-m'')$; and $(1-bl)\cdot(1-y'')$, respectively. That is to say the output signal $(1-bl)$ from the inverter 35-4 is supplied in parallel to the multipliers 36-1, 36-2 and 36-3 at respective inputs thereof and the output signals $(1-c'')$, $(1-m'')$ and $(1-y'')$ from the inverters 35-1, 35-2 and 35-3 are supplied to the other inputs of the multipliers 36-1, 36-2 and 36-3, respectively. The output product signals $(1-bl)\cdot(1-c'')$; $(1-bl)\cdot(1-m'')$; and $(1-bl)\cdot(1-y'')$ are supplied to a second black adder 37 comprising variable resistors 37-1, 37-2 and 37-3 through which the black signal bl is passed. Then, the signals $\alpha_4\cdot bl$ and $\gamma_4\cdot bl$ are added to the product signals $(1-bl)\cdot(1-c'')$, $(1-bl)\cdot(1-m'')$ and $(1-bl)\cdot(1-y'')$, respectively. By adjusting the variable resistors 37-1, 37-2 and 37-3, the coefficients $\alpha_4$, $\beta_4$ and $\gamma_4$ can be properly adjusted so as to regulate the amounts of black ink to be added to desired values. In this manner from the second black adder 37 the additive primary color signals R, G and B can be obtained. These signals are then further supplied to a paper color corrector 38 comprising variable resistors 38-1, 38-2 and 38-3 for adjusting the coefficients $\alpha_0$, $\beta_0$ and $\gamma_0$, respectively. By suitably adjusting the variable resistors 38-1, 38-2 and 38-3, the red, green and blue color signals can be adapted to the paper color. The corrected signals R′, G′ and B′ from the paper color corrector 38 is further supplied to a color monitor unit 40 which comprises a monitor gamma corrector 41. In general, a cathode ray tube of a monitor has a gamma of 2.2 and this gamma should be corrected to unity. For this purpose the color signals R′, G′ and B′ have to be reversely converted by passing them through non-linear circuits having a gamma of 0.45. Output signals R″, G″ and B″ from the monitor gamma corrector 41 are then supplied through a video amplifier 42 to a color monitor 43 on which a desired color image can be displayed.

When effecting color matching and color correction use may be made of standard color patches which have been printed by means of the standard color separation films. That is to say, on the monitor screen the color image of the original and the images of the color patches are simultaneously displayed. At first, coarse adjustment is effected in such a manner that the displayed color patch image becomes similar to the standard color patches which is placed beside the four color separation films. Next, while inspecting a halftone of the displayed color image, a fine adjustment is carried out. This adjustment is effected in the following order.

| | | |
|---|---|---|
| (1) | color of paper | $(\alpha_0, \beta_0, \gamma_0)$ |
| (2) | primary color | $(\alpha_1, \alpha_2, \alpha_3, \beta_1, \beta_2, \beta_3, \gamma_1, \gamma_2, \gamma_3)$ |
| (3) | secondary color | $(\alpha_5, \alpha_6, \alpha_7, \beta_5, \beta_6, \beta_7, \gamma_5, \gamma_6, \gamma_7)$ |
| (4) | tertiary color | $(\alpha_8, \beta_8, \gamma_8)$ |
| (5) | black color | $(\alpha_4, \beta_4, \gamma_4)$ |

As explained above, since the color reproduction process unit 30 according to the present embodiment comprises only seven multpliers; i.e. four in the color corrector 33 and three in the first black adder 36, the unit can be constructed in a simple and economic manner and accurate and reliable color reproduction can be carried out. Moreover since the number of elements to be adjusted is small, the adjustment of color can be effected in a very simple and stable manner. Further the influence due to lack of linear proportionality and the non-linearity of the cathode ray tube of the color monitor can be corrected and the color of paper, the primary, secondary, tertiary and black colors can be corrected or adjusted independently from each other. In this manner the color printing process can be easily and precisely simulated with the aid of the color image displayed on the color monitor.

Color Monitor Unit 40

Next, color monitor unit 40 will be explained in detail. In the printing color simulating apparatus according to the present embodiment, a large twenty inch color cathode ray tube 43 is used. In order to investigate the displayed color image in detail it is necessary to look at the screen from a position spaced from the screen by about 50 to 70 cms. Therefore, when the known color cathode ray tubes which have been used in the usual color television receivers designed for the NTSC standard system and color monitors are used, the scanning lines appear to be visible and thus, the operator can not judge the displayed colors accurately and gets tired. Therefore, according to the invention the number of scanning lines per frame is set to about 700 to 800 lines. In this embodiment the picture is displayed with 733 lines per frame and interlaced scanning is adopted. By using a color cathode ray tube having such a high resolution, it is possible to inspect the displayed color image to such an extent that the precise colors of details in the image can be accurately judged. Further the operator does not get tired. It has been found that if the number of scanning lines per frame is decreased below 700 lines, the scanning lines would appear to be visible rather clearly, and if the number of lines per frame is increased above 800 lines, Moiré might appear and further the degree of improvement in image quality would not be made higher than that expected. Moreover if the number of lines per frame is increased above 800 lines, the driving circuit and the signal processing circuit might become much complicated and expensive. Therefore, according to the invention the number of lines per frame is set to about 700 to 800 lines.

Further the color cathode ray tube 43 of the color monitor unit 40 has a color reproduction property which can reproduce the printing colors substantially completely. In the chromaticity diagram illustrated in FIG. 17, the dashed line represents a region which can be reproduced by color off-set printing and the chain line denotes a region which can be reproduced by the usual color cathode ray tube. Upon comparing these two regions, it is apparent that the printing color could never be reproduced by the known color cathode ray tube. In FIG. 17 the triangle shown by the solid line represents a region which can be reproduced by the color cathode ray tube 43 of the present invention. This region can substantially completely cover the printing color. This characteristics of the color cathode ray tube 43 can be obtained by adding to the known color cathode ray tube fluorescent material corresponding to $P_1$ of the sulphide series so as to extend the position of green in the chromaticity diagram.

According to the invention, the color cathode ray tube 43 of the color monitor unit 40 has a sufficiently high resolution and the color reproduction property is adapted to the printing color and thus, the printing color can be completely reproduced with a high fidelity and the simulation can be carried out precisely.

Further the average diameter of the fluorescent dots of the tube according to the invention is about 0.15 mms, while the average diameter of the known tube is about 0.31 mms.

Dot Percentage Measuring Unit 50

Next the dot percentage measuring unit 50 will be described in detail. In the color printing process simulating apparatus it is necessary to measure dot percentages of four color inks of cyan, magenta, yellow and black at any desired points in the image in order to grasp various conditions in the printing process. That is to say, when the color image displayed on the monitor screen has portions to be corrected such as portions having insufficient color reproduction, portions having unfavorable tone and dark portions, it is necessary to measure the amounts of the respective color inks, i.e. percentages of dot areas and to establish standards or indications for correction. The dot percentages can be measured from amplitudes of the respective color image signals at any desired points in the color image. However, in fact, the color image signals have noise and variations termed as jitter or flicker, and the measured amplitudes of the color image signals at a single point in the image fluctuate for each field and do not have constant values. In the known measuring methods average values of the amplitudes of the color image signals for several fields are derived by means of time constant circuits. In this case it is impossible to measure the dot percentages at small areas. Further in the known apparatus the measured amplitudes are displayed by meters having indicating points, but could not be displayed as digital values.

The dot percentage measuring unit 50 according to the present embodiment can obviate the above drawbacks of the known apparatus. In the unit 50, the subtractive primary color image signals derived from the color separation films are sampled several times at a desired point in the image and the sampled amplitudes are converted into pulses having frequencies proportional to the sampled values. These pulses are accumulated to derive average values and the average values thus derived are displayed as the dot percentages at the related point in the color image.

In the dot percentage measuring unit 50, the amplitude of the respective subtractive color image signals corresponding to the desired point is sampled and held every field by a sample and hold circuit 51 and the sampled value is converted into pulses (ni) having frequencies which are proportional to the value (Eshi) by a V/F converter 52. These pulses are then divided by N in a decoder 53 and the output from the decoder is accumulated by a counter for N fields to obtain an average value of $$\frac{1}{N}\sum_{i=1}^{N} ni,$$

which represents digitally the amplitude of the relevant image signal at the related point in the image displayed on the monitor.

By means of such a unit 50, it is possible to measure the amplitude of the desired portion of a small area by decreasing the width of the sampling pulses. Further, an accurate measurement can be effected by increasing the value N even if the image signals include noise and jitter. Moreover, since the measured values can be obtained as the digital values, they may be stored in registers and may be displayed simply by suitable digital display devices 54C, 54M, 54Y and 54BL.

FIG. 18 illustrates the detailed construction of the dot percentage measuring unit 50 of the present embodiment. In FIG. 18, the subtractive primary color image signals C, M, Y and BL supplied from the control unit 20 are processed by the color reproduction process unit 30 and converted into the additive primary color television signals of red, green and blue which are then supplied to the color monitor unit 40 and are displayed on the color cathode ray tube 43. On the screen of cathode ray tube 43 is also displayed a cursor 43A for denoting a measuring point or area on the screen. The position and size of cursor 43A can be changed at will on the monitor screen in the same manner as the area for the above described partial correction. In order to clearly distinguish the cursor from the remaining part, the cursor 43A may be white. To this end the area generating circuit 22 is provided with a white/correction selecting switch 22A as shown in FIG. 1. A measuring point is denoted by 43B and is situated at the upper left corner. This point may be set at any desired position.

The subtractive primary color signals C, M, Y and BL derived from the four color separation films are also supplied to a switcher 151. The switcher 151 is preset by a preset input PS and is changed by switching pulses (shown in FIGS. 19(*a*) to 19(*d*)) supplied from a switching pulse generator 153 which receives output pulses from a preset counter 152 which counts field synchronizing pulses VD to produce an output pulse every N fields. Therefore, the switcher 151 supplies the color signals C, M, Y and BL in succession every N fields to the sample and hold circuit 51. The respective image signals Ei (shown in FIG. 20(*a*)) are sampled by sample pulses SP supplied from the area generator 22 every field and sampled amplitude values Eshi are held (see FIG. 20(*c*)) therein. The area generator 22 receives the line and field synchronizing pulses rlD and VD and produces pulses for displaying the cursor 43A and the sampling pulses corresponding to the measuring point 43B at the upper left corner of the cursor. The position and size of the cursor can be adjusted by variable resistors 154, 155 and 156, respectively which are actuated by the knob 23 and the dials 24X and 24Y, respectively. The area generator itself is well known and thus, a detailed explanation thereof is omitted.

The amplitude values Eshi sampled and held in successive fields are supplied to the V/F converter 52 and are converted into pulse signals ni (see FIG. 20(*d*)) each having a frequency proportional to the respective amplitude values. These pulses are supplied to a frequency divider 157. The frequency divider 157 is preset to the same value as that of the preset counter 152 by means of the preset input PS and divides the pulses ni from the V/F converter by N. An output from the divider 157 is supplied to a counter 158 which accumulates the pulses (ni) divided by N for N fields so as to produce the average value of $$\frac{1}{N}\sum_{i=1}^{N} ni$$

of the image signals at the upper left point 43B of the cursor 43A displayed on the monitor screen. Each of the average values of the four color image signals is supplied through a switcher 159 which is driven by the switching pulses from the pulse generator 153 to corresponding registers 160C, 160M, 160Y and 160BL and is stored therein by load pulses shown in FIG. 20(*e*). At the same time the counter 158 is reset. The measured values stored in the registers 160C, 160M, 160Y and 160BL are supplied to the digital numeric displaying devices 54C, 54M, 54Y and 54BL, respectively and are displayed thereon as dot percentage values.

As described above in detail, in the dot percentage measuring unit 50, the amplitude values of the respective subtractive primary color image signals at a point in the color image displayed on the monitor screen are measured digitally as the average values over N fields and thus, the highly reliable dot percentages can be obtained and displayed digitally even under conditions of noise and jitter or flicker. The number N of fields can be adjusted at will by changing the preset value N in the preset counter 152 and frequency divider 157. The number of fields N may be changed from ten to fifteen and usually sufficiently reliable measurement can be effect with N equal to ten. Further the point to be measured can be simply selected by moving the cursor 43A. In this manner, any desired point in the displayed image can be selected at will and the dot percentages at this selected point can be obtained in a very simple manner. Moreover, since the single measuring circuit is selectively used for measuring the dot percentages of the four color signals in succession, the construction can be made simple. It should be noted that the dot percentages of the respective color signals are automatically measured without any manual operation. Further, since the output pulses from the V/F converter 52 are divided by N, it is sufficient for the counter 158 to have a relatively small capacity. In this manner, the dot percentages of the respective color signals at any desired point in the image displayed on the monitor screen can be measured simply and accurately by means of a simple circuit.

Automatic Calibrating Unit 60

Finally the automatic calibrating unit 60 will be explained in detail. In the color printing process simulating apparatus, in order to effect a numerical control upon the process conditions, it is necessary to measure the dot percentages of the respective subtractive primary color signals. This measurement is carried out by measuring the amplitude value of the color signals which have been amplified and processed. Therefore, in order to increase the measuring accuracy it is necessary to calibrate precisely the amplifiers and color adjusting circuits for processing the color signals. In the known apparatus this calibration is effected by manually adjusting the gains of the amplifiers. This is time consuming work and further it is very difficult to calibrate the circuits in a precise manner.

The automatic calibrating unit 60 can effect the above calibration automatically and accurately. To this end the zero adjuster 20-1 in the control unit 20 is provided with adjustable gain amplifiers and output signals from the amplifiers are supplied through calibration switches to a detector in which the output signals are compared with a standard voltage, and outputs from the detector are used to adjust output voltages from analog memories connected to gain adjusting inputs of the adjustable gain amplifiers so as to control the gains of the amplifiers in such a manner that the output voltages from the amplifiers are made equal to the standard voltage.

FIG. 21 shows schematically the entire printing color simulating apparatus with the automatic calibrating unit 60 being illustrated in detail. The subtractive primary color signals C, M, Y and BL supplied from the photomultipliers 14C, 14M, 14Y and 14BL, respectively and amplified by the preamplifiers 15C, 15M, 15Y and 15BL, respectively are supplied to adjustable gain amplifiers 200C, 200M, 200Y and 200BL, respectively provided in the zero adjuster 20-1 of the control unit 20. The amplified signals are further processed by correcting and adjusting circuits 201C, 201M, 201Y and 201BL, respectively, supplied to the color reproduction process unit 30, converted into the additive primary color signals of red, green and blue, and then is displayed on the color cathode ray tube 43 in the color monitor unit 40.

The dot percentage measuring unit 50 is to measure the dot percentages of the respective color signals of cyan, magenta, yellow and black at any desired point in the color image displayed on the color monitor 43. As explained above the unit 50 comprises the switcher 151, the sample and hold circuit 51, the V/F converter 52, the frequency divider 157, the counter 158 and the register 160.

In order to effect the dot percentage measurement in an accurate manner, it is necessary to calibrate the gains of the subtractive primary color image signals in a precise and accurate manner. For this purpose the output signal Ei from the counter 158 in the dot percentage measuring unit 50 is supplied through a calibration switch 60-1 to a detector 60-2 in which the output signal Ei is compared with a standard voltage $V_0$. By means of an output signal from the detector 60-2, output voltages of analog memories 60-3C, 60-3M, 60-3Y and 60-3BL in a memory unit 60-3 are adjusted through a switcher 60-4 which is actuated in synchronism with the switcher 151. The output voltage of the analog memories are applied to gain adjusting inputs of the amplifiers 200C, 200M, 200Y and 200BL. In this manner the gains of the amplifiers 200C, 200M, 200Y and 200BL are automatically adjusted. In this embodiment, since the output Ei from the counter 158 is a digital value, the standard voltage Eo is also given as a digital value and a digital comparator 60-5 is provided in the detector 60-2. The comparator 60-5 compares these digital values with each other. In case of Eo<Ei, a switch $S_1$ is turned on and a switch $S_2$ is turned off. Then a positive voltage is applied to the analog memory 60-3C via the switcher 60-4 and the output voltage from the analog memory 60-3C is increased as shown in FIG. 22 by the curve $S_1$. On the contrary, when Eo>Ei, the switches $S_1$ and $S_2$ are switched off and on, respectively so as to apply a negative voltage to the analog memory 60-3C and thus, the output voltage from the analog memory 60-3C is decreased as illustrated by the curve $S_2$ in FIG. 22. When Eo=Ei, both the switches $S_1$ and $S_2$ are off so as to maintain the output voltage from the analog memory 60-3C as it is. It should be noted that the output Ei from the counter 151 may be converted into an analog value and the comparator 60-5 may be a differential amplifier which compares the converted analog value with an analog standard voltage Eo.

Next, the operation of the automatic calibrating unit 60 will be explained. Upon calibration, the calibration switch 60-1 is closed, without setting the color separation films in the scanning unit 10, after a sufficient time has elapsed from the instant that the power supply was switched on, during which the simulating apparatus has become stable. Since the table of the scanning unit 10 is made of transparent glass, the photomultipliers 14C, 14M, 14Y and 14BL produce standard image signals which correspond to a transparent part of the color separation films FC, FM, FY and FBL, i.e. a white part. These signals are supplied through the control unit 20, the dot percentage measuring unit 50 and the switcher 60-1 to the detector 60-2. Now it is assumed that the switchers 151 and 60-4 are driven into the positions shown in FIG. 21. Then the amplitude value Ei of the image signal of cyan is supplied from the counter 158 to the detector 60-2 and is compared with the standard voltage Eo corresponding to white color. If the image signal is larger than the standard voltage Eo, the switches $S_1$ and $S_2$ are turned on and off, respectively and the positive voltage is applied to the analog memory 60-3C having the output connected to the adjustable gain amplifier 200C for amplifying the image signal of cyan. The output of the analog memory 60-3C is increased gradually and then the gain of the amplifier 200C is decreased accordingly to decrease the amplitude Ei of the image signal of cyan. When the amplitude Ei becomes equal to the standard value Eo, both the switches $S_1$ and $S_2$ are switched off and the analog memory 60-3C stores the gain adjusting voltage at this time. In this manner, the image signal process circuit is automatically calibrated on the basis of the standard voltage Eo. Also in case of the image signal Ei being lower than the standard value Eo, the automatic gain adjustment will be effected accurately in a similar manner. In this manner the remaining amplifiers 200M, 200Y and 200BL are automatically calibrated in succession in accordance with the switching operation of the switchers 151 and 60-4. Thus, the image signals of four substractive primary colors can be accurately and automatically calibrated in a short time period. After that the gain adjusting voltages are positively stored in the analog memories 60-3C, 60-3M, 60-3Y and 60-3BL and thus, the accurately calibrated condition can be maintained. It is preferable to provide a pilot lamp for indicating the completion of calibrating operation.

As explained above according to the automatic calibrating unit 60, the operator is sufficient to actuate the calibration switch 60-1 and then the image signal process circuit of the simulating apparatus can be calibrated in an automatic, accurate and prompt manner.

FIG. 23 illustrates the outer appearance of the color printing process simulating apparatus of the present enbodiment and FIG. 24 is a plan view showing the construction of the control panel thereof. In FIG. 23, the left hand portion indicates the scanning unit 10 comprising the pair of cathode ray tubes and the slidable projection optical systems at the upper portion and the photomultipliers and preamplifiers at the lower portion. In the original table 11 are arranged side by side the four transparent templates 1*a*, 1*b*, 1*c* and 1*d*. The right hand portion is the control section 200 and the various adjusting members are provided on its table. Further the color cathode ray tube 43 of the color monitor unit is arranged on the table. A panel 201 for setting a transparent original is arranged to the left of the tube 43 and comprises a semitransparent glass plate and a light source arranged behind the glass plate.

As shown in FIG. 24 on the control panel there are arranged the dials 20-1A, 21, switches 22A, 60-1 and selection buttons 20-3A, 20-4A, 20-5A, 20-6A, the numerical display devices 54C, 54M, 54Y, 54BL, the area setting dials 24X, 24Y and knob 23. In the control panel there is further provided an oscilloscope 250 for checking the operation of the apparatus by selecting any one of the primary color signals by means of color selection buttons 251. Further a test wave on/off switch 252 is provided in the control panel. When the switch 252 is actuated into the ON position, a test signal generator 253 shown in FIG. 1 is energized and a given test signal is supplied to the zero adjuster 20-1 and the screen gamma corrector 20-4 in the control unit 20. Then the test signal or test pattern is displayed on the monitor screen at its left hand portion. The test signal generator 253 is controlled by a system pulse generator 254 as illustrated in FIG. 1 and this system pulse generator also controls the area generator 22.

What is claimed is:

1. An apparatus for simulating a color printing process wherein first, second, third and fourth color separation films formed from a color original are displayed as a color image, comprising:

a scanner unit including a film setting stage for supporting said first, second, third and fourth color separation films in a side-by-side relation;

a first flying spot scanner tube for said first and second color separation films and a second flying spot scanner tube for said third and fourth color separation films;

a lens system for projecting a raster image of the screen of said first flying spot scanner tube onto said first and second color separation films and a raster image of the screen of said second flying spot scanner tube onto said third and fourth color separation films; and a photomultiplier for each of said color separation films, each of said photomultipliers generating a signal corresponding to a subtractive primary color signal;

control means coupled to said scanning unit for gamma-correcting said subtractive primary color signals;

color reproduction process means coupled to said control means for converting said gamma-corrected subtractive primary color signals to additive primary color signals; and a color monitor unit for receiving said displaying said additive primary color signals, said color monitor unit including a color cathode ray tube having green, blue and red light-emitting phosphor elements for exhibiting a color reproduction characteristic wherein the coordinates of the green-emitting phosphor elements are approximately X=0.2, Y=0.67 on the chromaticity diagram, the red-emitting and blue-emitting phosphor elements cooperating with said green-emitting phosphor elements to substantially completely reproduce the printing colors; and driving means for driving said color cathode ray tube at a resolution of between approximately 2.1 and 3 lines per millimeter.

2. An apparatus according to claim 1 wherein said four color separation films are supported on said stage by first, second, third and fourth transparent sections.

3. An apparatus according to claim 19, wherein, said first flying spot scanner tube has an optical axis which intersects perpendicularly said film setting stage at a point midway between said first and second color separation films, said lens system comprising a first lens group including first and second lens elements arranged on lines extending from the center of the screen of said first flying spot scanner tube and the centers of said first and second color separation films, respectively; and said second flying spot scanner tube has an optical axis which intersects perpendicularly said film setting stage at a point midway between said third and fourth color separation films, said lens system further comprising a second lens group including third and fourth lens elements arranged on lines extending from the center of the screen of said second flying spot scanner tube and the centers of said third and fourth color separation films, respectively.

4. An apparatus according to claim 3, wherein each of said first, second, third and fourth lens elements is arranged with its principal plane parallel to its associated color separation film.

5. An apparatus according to claim 3, wherein said transparent sections are rectangular and are arranged in a row with their long sides adjacent to each other.

6. An apparatus according to claim 3, wherein said first lens group further includes fifth and sixth lens elements, and said second lens group further includes seventh and eighth lens elements; and said scanning unit further comprises a sliding mechanism for selectively inserting into said optical axes either one of a set comprising said first, second, third and fourth lens elements and a set comprising said fifth, sixth, seventh and eighth lens elements.

7. An apparatus according to claim 1, wherein said control unit comprises means for effecting a gamma correction of ink with respect to primary color signals C, M and Y and a black signal BL which are derived by scanning four color separation films of cyan, magenta, yellow and black, respectively to produce corrected primary color signals c, m and y and a corrected black signal bl; and wherein said color reproduction process unit comprises means for receiving the corrected primary color signals c, m and y and generating secondary color signals cm, cy and my and a tertiary color signal cmy; means for adjusting the amplitudes of the primary, secondary and tertiary color signals independently from each other; means for summing the adjusted primary color signals c, m and y, the secondary color signals cm, cy and my and the tertiary color signal cmy to produce output signals c", m" and y"; means for receiving said output signals c", m" and Y" from the summing means and the gamma corrected black signal bl and for subtracting each of these signals c", m", y" and bl from unity to produce output signals (1−c"), (1−m"), (1−y") and (1−bl); first black adding means for receiving said output signals (1−c"), (1−m"), (1−y") and (1−bl) from the subtracting means and for multiplying the signals (1−c"), (1−m") and (1−y") by (1−bl), respectively to produce output product signals (1−bl)·(1−c"), (1−bl)·(1−m") and (1−bl)·(1−Y"); and second black adding means for receiving said output product signals (1−bl)·(1−c"), (1−bl)·(1−m") and (1−bl)·(1−y") from the first black adding means and the corrected black signal bl and for adding the corrected black signal with adjusted amplitude to the output product signals (1−bl)·(1−c"), (1−bl)·(1−m") and (1−bl)·(1−y"), respectively to produce output signals of red, green and blue colors R, G and B.

8. An apparatus according to claim 7, wherein said color reproduction process unit further comprises means for receiving said signals of red, green and blue colors R, G and B and for correcting these signals with respect to paper color to produce paper color corrected color signals; and wherein said color monitor unit comprises means for receiving the paper color corrected color signals R', G' and B' and for correcting monitor gamma to produce monitor gamma corrected color signals.

9. An apparatus according to claim 8, wherein said means for generating the secondary and tertiary color signals comprises first, second and third inputs for receiving the primary color signals c, m and y, respectively; and a first multiplier having inputs connected to the first and second inputs to produce the secondary color signal cm, a second multiplier having inputs connected to the first and third inputs to produce the secondary color signal cy, a third multiplier having input connected to the second and third inputs to produce the secondary color signal ym and a fourth multiplier having a first input connected to the output of any one of the first, second and third multipliers and a second input connected to one of the inputs which is not connected to the inputs of the multiplier the output of which is connected to said first input, to produce the tertiary color signal cmy.

10. An apparatus according to claim 8, wherein said means for adjusting the magnitudes of the primary, secondary and tertiary color signals comprises first, second, third, fourth, fifth, sixth and seventh inputs for receiving the primary color signals c, m, y, the secondary color signals cm, cy and ym, and the tertiary signal cmy, respectively; and first, second and third sets of seven variable resistors having one terminals connected to the first, second, third, fourth, fifth, sixth and seventh inputs, respectively.

11. An apparatus according to claim 8, wherein said first black adding means comprises first, second, third and fourth inputs for receiving the inverted signals (1−c"), (1−m"), (1−y") and (1−bl); a first multiplier having inputs connected to the first and fourth inputs to produce the product signal (1−bl)·(1−c"); a second multiplier having inputs connected to the second and fourth inputs to produce the product signal (1−bl)·(1−m"); and a third multiplier having inputs connected to the third and fourth inputs to produce the product signal (1−bl)·(1−y").

12. An apparatus according to claim 8, wherein said second black adding means comprises first, second, third and fourth inputs for receiving the product signals (1−bl)·(1−c"), (1−bl)·(1−m"), (1−bl)·(1−y") and the black signal bl; first, second and third fixed resistors having one terminals connected to the first, second and third inputs, respectively; and first, second and third variable resistors having one terminals connected commonly to the fourth input and the other terminals connected to other terminals of the respective first, second and third fixed resistors.

13. An apparatus according to claim 9, wherein said means for correcting the color of paper comprises first, second and third inputs for receiving the red, green and blue color signals, respectively; and first, second and third variable resistors having one ends connected to the first, second and third inputs, respectively.

14. An apparatus according to claim 1, further comprising a dot percentage measuring unit including a sample hold circuit for sampling the amplitudes of subtractive primary color signals and for holding the sampled values, a voltage/frequency converter for converting the sampled values into pulses (ni) having repetition frequencies proportional to the sampled values, a frequency divider for dividing the pulses by an integer N, a counter for accumulating output pulses from the frequency divider for N fields of the image signals to derive average amplitude value $$\frac{1}{N}\sum_{i=1}^{N} ni$$

as dot percentage values, and digital display devices for displaying the average amplitude values.

15. An apparatus according to claim 14, wherein said dot percentage measuring unit further comprises a first switcher connected to the input of the sample and hold circuit, a second switcher connected to the output of the counter and a control circuit for actuating said first and second switchers in synchronism with each other, the dot percentages of the respective subtractive color image signals being measured in succession.

16. An apparatus according to claim 14, wherein said dot percentage measuring unit further comprises manually operating means for selecting a point in the color image displayed on the color monitor screen.

17. An apparatus according to claim 14, further comprising an automatic calibration unit including gain adjustable amplifiers each for amplifying the respective subtractive primary color image signals, a calibration switch for selectively deriving any one of the output image signals from the gain adjustable amplifiers, a detector for comparing the derived image signal with a standard voltage to derive a difference signal, analog memories having outputs connected to gain adjusting inputs of the respective adjustable gain amplifiers, and a control circuit for controlling a related one of the output voltages of the analog memories in accordance with the difference signal, so that the gains of the subtractive primary color signals are automatically calibrated to the standard voltage.

* * * * *